US011713877B2

(12) United States Patent
Goertz et al.

(10) Patent No.: US 11,713,877 B2
(45) Date of Patent: Aug. 1, 2023

(54) SYSTEMS AND METHODS FOR REMOVING ORGANIC COMPOUNDS FROM STEAM

(71) Applicant: Donaldson Company, Inc., Minneapolis, MN (US)

(72) Inventors: Matthew P. Goertz, Bloomington, MN (US); Colter A. Marcks, Ellsworth, WI (US); Bradly G. Hauser, Minneapolis, MN (US); Andrew J. Dallas, Lakeville, MN (US)

(73) Assignee: Donaldson Company, Inc., Bloomington, MN (US)

( * ) Notice: Subject to any disclaimer, the term of this patent is extended or adjusted under 35 U.S.C. 154(b) by 10 days.

(21) Appl. No.: 17/051,913

(22) PCT Filed: May 3, 2019

(86) PCT No.: PCT/US2019/030569
§ 371 (c)(1),
(2) Date: Oct. 30, 2020

(87) PCT Pub. No.: WO2019/213500
PCT Pub. Date: Nov. 7, 2019

(65) Prior Publication Data
US 2021/0239314 A1 Aug. 5, 2021

Related U.S. Application Data

(60) Provisional application No. 62/667,097, filed on May 4, 2018.

(51) Int. Cl.
*F22B 37/26* (2006.01)
*B01D 53/22* (2006.01)
(Continued)

(52) U.S. Cl.
CPC ............ *F22B 37/26* (2013.01); *B01D 53/226* (2013.01); *B01D 53/227* (2013.01);
(Continued)

(58) Field of Classification Search
None
See application file for complete search history.

(56) References Cited

U.S. PATENT DOCUMENTS 3,274,029 A 9/1966 Lurie et al.
3,424,548 A 1/1969 Gunther
(Continued)

FOREIGN PATENT DOCUMENTS

CN 1750867 3/2006
CN 102165268 8/2011
(Continued)

OTHER PUBLICATIONS

3-A Sanitary Standards, Inc., et al., "3-A® Accepted Practices for a Method of Producing Culinary Steam, No. 309-03", Nov. 21, 2004, 3-A Sanitary Standards, Inc., McLean, Viriginia, 8 pages.
(Continued)

*Primary Examiner* — Jason M Greene
(74) *Attorney, Agent, or Firm* — Mueting Raasch Group

(57) ABSTRACT

A system for producing steam includes a steam generator with steam output; a membrane filtration system in fluid communication with the steam output and including a membrane filter with a permeate side and an opposing retentate side. The membrane filter includes a separation membrane constructed to reject organic molecules. The system may be used for removing organic compounds, such as anti-corrosion agents or contaminants, from steam.

18 Claims, 3 Drawing Sheets

(51) Int. Cl.
  *B01D 65/02* (2006.01)
  *B01D 69/10* (2006.01)
  *B01D 71/32* (2006.01)
  *F22B 37/02* (2006.01)

(52) U.S. Cl.
  CPC ......... *B01D 53/228* (2013.01); *B01D 53/229* (2013.01); *B01D 65/02* (2013.01); *B01D 69/10* (2013.01); *B01D 71/32* (2013.01); *F22B 37/025* (2013.01); *B01D 2257/708* (2013.01); *B01D 2311/25* (2013.01); *B01D 2311/2626* (2013.01); *B01D 2311/2649* (2013.01); *B01D 2315/08* (2013.01); *B01D 2321/04* (2013.01)

(56) References Cited

U.S. PATENT DOCUMENTS

| | | | |
|---|---|---|---|
| 4,342,730 | A | 8/1982 | Perrotta |
| 4,395,494 | A * | 7/1983 | Bodart .................. G01N 31/22 436/111 |
| 4,437,968 | A | 3/1984 | Elliott, Jr. |
| 4,879,041 | A | 11/1989 | Kurokawa et al. |
| 4,895,685 | A | 1/1990 | Honda et al. |
| 4,985,147 | A | 1/1991 | Mochizuki et al. |
| 5,059,327 | A | 10/1991 | Takegami |
| 5,707,522 | A | 1/1998 | Maeda et al. |
| 5,892,129 | A | 4/1999 | Hoepp et al. |
| 5,954,966 | A | 9/1999 | Matsuura et al. |
| 6,210,464 | B1 | 4/2001 | Nakanishi et al. |
| 6,406,517 | B1 * | 6/2002 | Avery .................. B01D 53/228 96/13 |
| 6,413,303 | B2 | 7/2002 | Gelderland et al. |
| 6,572,679 | B2 | 6/2003 | Baker et al. |
| 6,645,271 | B2 | 11/2003 | Seguin et al. |
| 6,708,517 | B1 | 3/2004 | Piao et al. |
| 6,789,288 | B2 | 9/2004 | Wijmans et al. |
| 7,964,411 | B2 | 6/2011 | Dasgupta et al. |
| 8,282,708 | B2 | 10/2012 | Spiegelman et al. |
| 8,769,971 | B2 | 7/2014 | Kozubal et al. |
| 8,828,121 | B1 | 9/2014 | He et al. |
| 9,061,252 | B2 | 6/2015 | Huang et al. |
| 9,387,445 | B2 | 7/2016 | Kimura et al. |
| 2006/0070867 | A1 | 4/2006 | Ikeda |
| 2008/0017578 | A1 * | 1/2008 | Childs .................. B01D 69/10 210/650 |
| 2010/0319535 | A1 | 12/2010 | Joshi et al. |
| 2011/0000367 | A1 | 1/2011 | Kanougi et al. |
| 2011/0107911 | A1 * | 5/2011 | Hoang ................. B01D 53/228 95/45 |
| 2013/0233170 | A1 * | 9/2013 | Spiegelman ........... B01D 53/22 95/23 |
| 2015/0159556 | A1 * | 6/2015 | Scipio .................. F01D 25/007 60/775 |
| 2015/0204536 | A1 * | 7/2015 | Singh ..................... B01D 53/22 122/406.1 |
| 2015/0375173 | A1 | 12/2015 | Steen |
| 2016/0290664 | A1 | 10/2016 | Dean et al. |
| 2017/0368498 | A1 | 12/2017 | He et al. |
| 2021/0107808 | A1 | 4/2021 | Goertz et al. |

FOREIGN PATENT DOCUMENTS

| | | |
|---|---|---|
| CN | 106621853 | 5/2017 |
| CN | 108726501 | 11/2018 |
| EP | 0707179 | 4/1996 |
| EP | 2188036 | 5/2010 |
| JP | H01107805 | 4/1989 |
| JP | H0398687 | 4/1991 |
| JP | H03202133 | 9/1991 |
| WO | 2009012189 | 1/2009 |
| WO | 2011/095805 | 8/2011 |
| WO | 2019/213500 | 11/2019 |

OTHER PUBLICATIONS

European Patent Application No. 08 78 1753, filed Feb. 12, 2010, Supplementary European Search Report dated Jul. 18, 2011, 4 pages.

Huang, et al., "Ethanol Dehydration Using Hydrophobic and Hydrophilic Polymer Membranes", 2010, Ind. Eng. Chem. Res., 49(23): 12067-12073. Available online Jun. 15, 2010.

Information Sheet, "Culinary grade steam filters: Specification guidelines: Process Filtration", 2016, Donaldson Filtration Solutions, Donaldson Company, Inc., Minneapolis, Minnesota, 2 pages.

International Patent Application No. PCT/US2019/030569 filed May 3, 2019 PCT International Search Report and Written Opinion dated Jul. 23, 2019, 10 pages.

International Patent Application No. PCT/US2019/030569, filed May 3, 2019; PCT International Preliminary Report on Patentability dated Nov. 10, 2020, 7 pages.

Pinnau, et al., "Gas and vapor transport properties of amorphous perfluorinated copolymer membranes based on 2,2-bistrifluoromethyl-4,5-difluoro-1,3-dioxole/tetrafluoroethylene", Jan. 10, 1996, Journal of Membrane Science, 109 (1):125-133.

Memarzadeh, "Adding amines to steam for humidification", Journal of Chemical Health & Safety, Jul./Aug. 2014, 21(4):5-17.

* cited by examiner

SYSTEMS AND METHODS FOR REMOVING ORGANIC COMPOUNDS FROM STEAM

CROSS REFERENCE TO RELATED APPLICATIONS

This application is the § 371 U.S. National Stage of International Application No. PCT/US2019/030569, filed 3 May 2019, which claims the benefit of U.S. Provisional Application No. 62/667,097, filed 4 May 2018, the disclosures of which are incorporated by reference herein in their entireties.

FIELD

The present disclosure relates to systems and methods for removing compounds from steam. In particular, the present disclosure relates to systems and methods for removing organic compounds, such as compounds used as anti-corrosion agents, from steam.

BACKGROUND

Steam is used in many industries for various purposes, including transferring heat or thermal energy from a source to a point of use. Steam may be produced in various ways, including using a boiler, where water is heated to its boiling point. The water can be heated directly or indirectly using a heat source, such as a burner, a heat exchanger, or an electric heater. Using direct heat boilers is most common, as the systems are simpler, more efficient, and more cost-effective than, for example, heat exchangers.

Due to the potentially corrosive nature of dissolved acids, such as carbonic acid, in steam, it may be necessary to add anti-corrosion agents to the steam to protect the boiler and other parts of the system (e.g., metal piping). However, for some end uses of steam it would be desirable to provide steam that does not contain anti-corrosion agents or other compounds that are incompatible with the particular end use.

SUMMARY

The present disclosure relates to a system for producing steam, the system including a boiler with a steam output and a membrane filtration system in fluid communication with the steam output. The membrane filtration system includes a first membrane filter with a permeate side and an opposing retentate side. The membrane filter includes a separation membrane adjacent the permeate side, the separation membrane being constructed to reject organic molecules; and one or more support layers adjacent the retentate side.

The separation membrane may include a fluorinated (e.g., perfluorinated) polymer membrane (e.g., separation layer) and one or more support layers comprising polyamide, polyimide, polysulfone, polyphenylene sulfide, PVDF, PTFE, or a combination thereof. The membrane filter may include a plurality of layers of separation membranes separated by spacers, where the spacers are constructed from polyamide, polyimide, polypropylene, polyethylene, PTFE, PVDF, or a combination thereof.

The system may include one or more additional filters upstream of the membrane filter or downstream of the membrane filter permeate side. The one or more additional filters may include a second membrane filter, an adsorbent filter, a particle filter, or a combination thereof.

The system may be used to provide steam to a sterilizer, a humidifier, or a culinary steam outlet.

The present disclosure further relates to a method for removing an organic compound from steam, the method including directing a cross-flow of pressurized steam having a first concentration of the organic compound across a membrane filter. The membrane filter includes a separation membrane constructed to reject the organic compound; and one or more support layers adjacent the retentate side. The method further includes collecting a steam permeate having a second concentration of the organic compound lower than the first concentration.

The organic compound may be an anti-corrosion agent, such as an amine. The first concentration may be greater than 20 ppm and the second concentration may be lower than 10 ppm.

DETAILED DESCRIPTION

Figure 1:
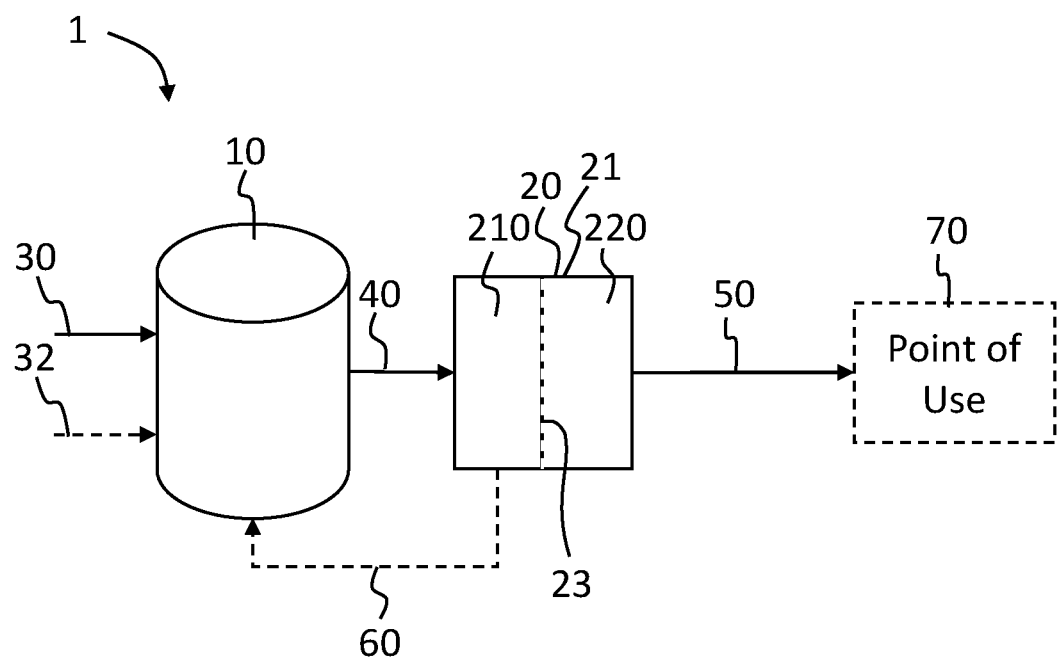
FIG. 1 is a flow diagram of a steam supply system according to an embodiment.

The present disclosure relates to systems and methods that are suitable for removing compounds, such as organic molecules, from steam. In particular, the present disclosure relates to systems and methods that are suitable for removing organic compounds, such as organic contaminants or compounds used as anti-corrosion agents, from steam. The systems and methods of the present disclosure may be useful for preparing clean steam for various end uses.

The term "alkylated" is used in this disclosure to describe compounds that are reacted to replace a hydrogen atom or a negative charge of the compound with an alkyl group, such that the alkyl group is covalently bonded to the compound.

The term "alkyl" is used in this disclosure to describe a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, etc.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "aromatic ring" is used in this disclosure to refer to a conjugated planar ring system of an organic compound. Aromatic rings may include carbon atoms only, or may include heteroatoms, such as oxygen, nitrogen, or sulfur.

The term "amine" is used here to refer to compounds that include a basic nitrogen atom with a lone electron pair. Amines can be either primary (including functional group —$NR^1H_2$), secondary (including functional group —$NR^1R^2H$), or tertiary (including functional group —$NR^1R^2R^3$) The R-groups may be independently selected, and may include alkyl groups, aryl groups, or halides.

The term "volatile" is used here to refer to compounds that have an initial boiling point less than or equal to 250° C. measured at a standard atmospheric pressure of 101.3 kPa.

The term "substantially" as used here has the same meaning as "significantly," and can be understood to modify the term that follows by at least about 75%, at least about 90%, at least about 95%, or at least about 98%. The term "not substantially" as used here has the same meaning as "not significantly," and can be understood to have the inverse meaning of "substantially," i.e., modifying the term that follows by not more than 25%, not more than 10%, not more than 5%, or not more than 2%.

Relative terms such as proximal, distal, left, right, forward, rearward, top, bottom, side, upper, lower, horizontal, vertical, and the like may be used in this disclosure to simplify the description. However, such relative terms do not limit the scope of the invention in any way. Terms such as left, right, forward, rearward, top, bottom, side, upper, lower, horizontal, vertical, and the like are from the perspective observed in the particular figure.

The terms "upstream" and "downstream" are used there to refer to a position along the flow of steam from the stream generator to the point of use. The steam generator is considered to be at or near the upstream end of the system, and the point of use is considered to be at or near the downstream end of the system.

The terms "proximal" and "distal" are used to represent directions relative to a user using or holding the article. That is, the term "distal" is used to refer to the direction away from the user and toward the applicator-end of the dispenser; and the term "proximal" is used to refer to the direction toward the user and away from the applicator-end.

The term "about" is used here in conjunction with numeric values to include normal variations in measurements as expected by persons skilled in the art, and is understood have the same meaning as "approximately" and to cover a typical margin of error, such as ±5% of the stated value.

Terms such as "a," "an," and "the" are not intended to refer to only a singular entity, but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

According to some embodiments, the systems and methods of the present disclosure are suitable for removing compounds, such as organic molecules, from steam. For example, the systems and methods of the present disclosure are suitable for removing organic compounds, such as organic contaminants or compounds used as anti-corrosion agents, from steam. The systems and methods of the present disclosure may be particularly useful for providing clean steam to end uses that need steam without additives, such as anti-corrosion agents. Examples of such end uses include humidification, sterilization, and culinary uses.

Anti-corrosion agents may be added to steam either in a boiler or in-line to prevent corrosion of various components of the system, such as the boiler, pipes and lines (e.g., steel pipes), tanks, and other elements that may come in contact with the steam. Some anti-corrosion agents may be added in the boiler but due to their non-volatile nature, remain there as the steam is let out of the boiler. However, some anti-corrosion agents are volatile, and vaporize and travel with the steam downstream of the boiler. Examples of such anti-corrosion agents include volatile amines (sometimes called "boiler amines" or "neutralizing amines"). While these agents have beneficial effects within the boiler system, they may be undesirable at the point of use. It may therefore be desirable to reduce the amount of or remove (e.g., substantially remove) the agents prior to use.

Prior attempts to remove amines from steam include the use of packed bed adsorbent filters, such as those described in U.S. Pat. Nos. 3,424,548 and 4,342,730. For example, U.S. Pat. No. 3,424,548 describes a metallic pressure cartridge constructed of stainless steel and containing an adsorbent resin, connected to a steam supply, and arranged such that steam enters the top of the cylinder and flows down through the adsorbent resin. The resin may be a material capable of adsorbing the volatile amines in the steam, such as an inorganic hydrous oxide with cationic properties, e.g., zirconium phosphate or zirconium tungstate. U.S. Pat. No. 4,342,730 describes a system and method for purifying steam by passing the steam through a particulate filter and then a bed of ion-exchange resin material. The resin material is a strong-acid type polymeric resin, such as a styrene copolymer, in hydrogen form, that captures amines in an acid-base reaction. The resin may be able to remove amines from the steam so that the recovered steam has less than 3 ppm of volatile alkaline material left. However, while packed bed filters may be effective for removing volatile organic compounds from steam, they are typically not very efficient, suffering from a limited capacity. Packed bed filters typically need frequent regeneration and have a limited lifetime before breakthrough of the volatile compounds occurs.

The systems and methods of the present disclosure are suitable for removing organic molecules from steam. However, the systems and methods are not limited to anti-corrosion agents only, and may be used to remove any undesirable organic components as long as a suitable filter membrane can be provided.

Referring now to FIG. 1, according to some embodiments, the steam supply system 1 includes a steam generator 10 having an inlet line 30 and a steam output 40. For example, the system 1 may include a steam generator 10 such as a boiler, a heat exchanger, or an electrically heated steam generator. In one embodiment, the steam generator 10 is a boiler. Water and/or steam is heated in the steam generator 10 by a heater 12 (see, e.g., FIG. 3). The steam generator 10 and the steam output 40 may have a steam capacity of at least about 10 lbs/hour (about 5 kg/h), at least about 100 lbs/hour (about 50 kg/h), at least about 500 lbs/hour (about 200 kg/h), and/or up to about 1,000 lbs/hour (about 500 kg/h), up to about 5,000 lbs/hour (about 2,000 kg/h), or up to about 10,000 lbs/hour (about 5,000 kg/h).

The steam supply system 1 may be part of a larger system, where the steam output 40 is connected to one or more points of use. The system 1 may also include a mechanism for adding anti-corrosion agents or other compounds to the steam. For example, the system may include one or more storage tanks and injections lines 32 for additives (e.g., anti-corrosion agents). The additives may be injected directly into the boiler or into some other part of the system, e.g., an input line transporting water into the steam generator or an output line transporting steam from the steam generator. For example, the system 1 may include an injection line 32 in fluid communication with the steam generator 10 (e.g., boiler).

According to an embodiment, the organic molecules are removed from the steam in a membrane filtration system 20. It should be understood that complete (100%) removal may not always be practical, and the term "remove" is used here to include partial removal (e.g., removing 50 wt-% or more, 60 wt-% or more, 70 wt-% or more, 80 wt-% or more, 90 wt-% or more, 95 wt-% or more, 98 wt-% or more, or 99 wt-% or more).

The steam output 40 of the steam generator 10 (e.g., boiler) may be in fluid communication with a membrane filtration system 20 that includes one or more membrane filters 21. The membrane filter 21 has a retentate side 210 (e.g., feed side) and an opposing permeate side 220. The membrane filter 21 includes a selective separation membrane 23 that allows water molecules in vapor phase (e.g., steam) to pass through, while rejecting (e.g., retaining, not allowing to pass through the membrane) the organic molecules desired to be removed. The permeate (e.g., filtered steam) of the membrane filter 21 can be used at a point of use 70 that is in fluid communication with the membrane filtration system 20. The point of use 70 may be, for example, a sterilizer, a humidifier, or a culinary steam outlet.

Figure 2:
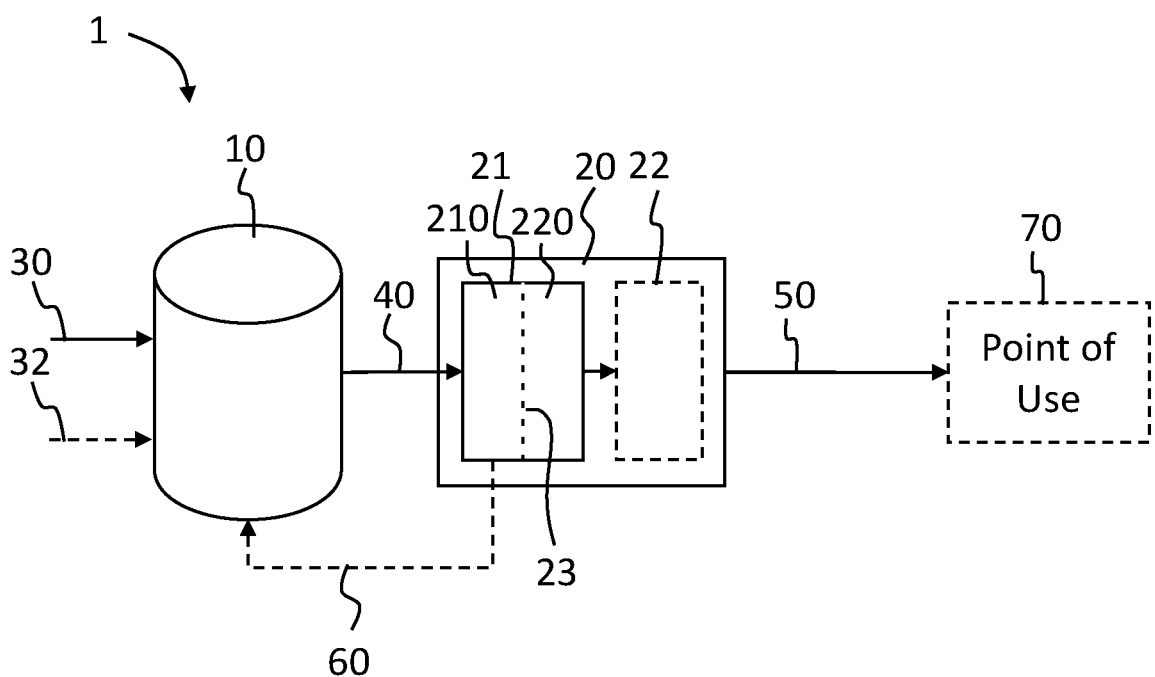
FIG. 2 is a flow diagram of the steam supply system of FIG. 1 according to an embodiment.
Figure 3:
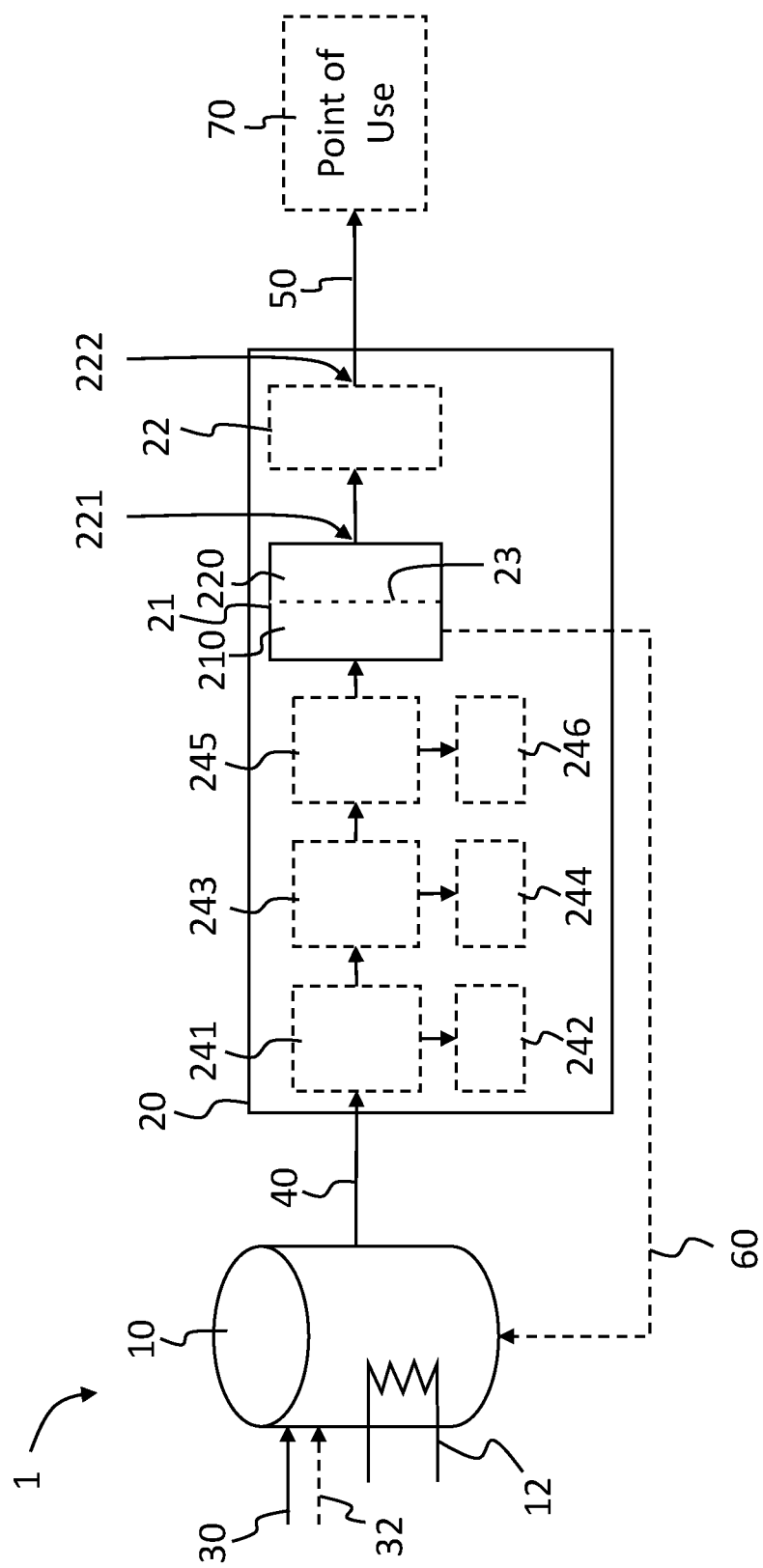
FIG. 3 is a flow diagram of the steam supply system of FIG. 1 according to an embodiment.

As shown in FIGS. 2 and 3, the membrane filtration system 20 may include additional filters in addition to the one or more membrane filters. For example, the membrane filtration system may include various sizes of particle filters 241, 243, 245, an adsorbent filter 22, or a combination thereof. Particle filters may be used to remove solid particles or liquid droplets. The additional filters may be independently selected and placed either upstream or downstream of the membrane filter 21 (e.g., downstream of the permeate side 220 of the membrane filter 21.) In the exemplary embodiment shown in FIG. 2, the system includes a membrane filter 21 and an adsorbent filter 22 downstream of the membrane filter 21. In the exemplary embodiment shown in FIG. 3, the system includes a membrane filter 21, an adsorbent filter 22 downstream of the membrane filter, and multiple particle filters 241, 243, 245. The particle filters 241, 243, 245 may be positioned upstream or downstream of the membrane filter 21. For example, particle filters 241, 243, 245 of decreasing size cut-offs may be arranged upstream of the membrane filter 21, as shown. A particle filter may also be positioned downstream of the adsorbent filter 22 to remove any fibers shed by the adsorbent filter 22.

In some embodiments, the membrane filtration system 20 includes one or more particle filters 241, 243, 245. The particles filters 241, 243, 245 may have a size cut-off of about 2 mm, 1 mm, 500 μm, 200 μm, 100 μm, 80 μm, 50 μm, 40 μm, 30 μm, 25 μm, 20 μm, 15 μm, 10 μm, 8 μm, 5 μm, 4 μm, 3 μm, 2 μm, or 1 μm. The membrane filtration system may include a combination of two or more particle filters with different size cut-offs. In one exemplary embodiment, a first particle filter 241 has a particle size cut-off of about 1 mm; a second particle size filter 243 has a particle size cut-off of about 25 μm; and a third particle size filter 245 has a particle size cut-off of about 5 μm. Each of the particle filters 241, 243, 245 may further be associated with a corresponding trap 242, 244, 246 or drain for removing separated particulate matter from the system.

In some embodiments, the membrane filtration system 20 includes one or more adsorbent filters 22. For example, the membrane filtration system 20 may include adsorbent filters 22 as a polishing step to remove remaining organic molecules that were not removed by the membrane filter 21. The adsorbent filter 22 may be arranged as a packed bed filter that contains an adsorbent and/or absorbent material, such as activated charcoal, a molecular sieve, other suitable materials, or a combination thereof. The number and size of adsorbent filters 22 in the membrane filtration system 20 may be selected to achieve a desired capacity of removal.

A flow of steam (e.g., cross-flow 101 shown in FIG. 4A) entering the membrane filter 21 may have a first concentration of the organic compound. The permeate 120 exiting the permeate side 220 of the membrane filter 21 at a first treated steam outlet 221 may have a second (reduced) concentration of the organic compound. If an adsorbent filter 22 is included, the permeate 120 is further treated in the adsorbent filter 22 and exits the adsorbent filter 22 at a second treated steam outlet 222, having a third (further reduced) concentration of the organic compound.

In embodiments where the membrane filtration system is used for removing anti-corrosive agents (e.g., amines) from the steam, the steam becomes corrosive after the treatment (e.g., removal of anti-corrosive agents), and it may thus be desirable to limit the exposure time of the downstream components to the treated steam by positioning the membrane filtration system in relatively close proximity to the point of use. For example, the treated steam may have a residence time of about 10 seconds or less, about 5 seconds or less, about 2 seconds or less, about 1 seconds or less, about 0.5 seconds or less, or about 0.1 seconds or less between the first treated steam outlet 221 and the point of use 70, and/or between the second treated steam outlet 222 and the point of use 70. In some embodiments, the first treated steam outlet 221 and/or the second treated steam outlet 222 may be positioned within 30 feet (10 meters), or within 10 feet (3 meters), or within 3 feet (1 meter) from the point of use 70. Put another way, it may be beneficial for the line 50 connecting the first treated steam outlet 221 and/or the second treated steam outlet 22 to the point of use to be 30 feet (10 meters) long or shorter, 10 feet (3 meters) long or shorter, or 3 feet (1 meter) long or shorter. The distances are given here as the linear length of the line 50 connecting the first treated steam outlet 221 and/or the second treated steam outlet 22 to the point of use.

The membrane filtration system 20 may include one or more membrane filters 21 to achieve a desired capacity for the membrane filtration system 20. In embodiments where the membrane filtration system 20 includes a plurality of membrane filters 21, the membrane filters 21 may be arranged in parallel, in series, or a combination thereof.

Figure 4A:
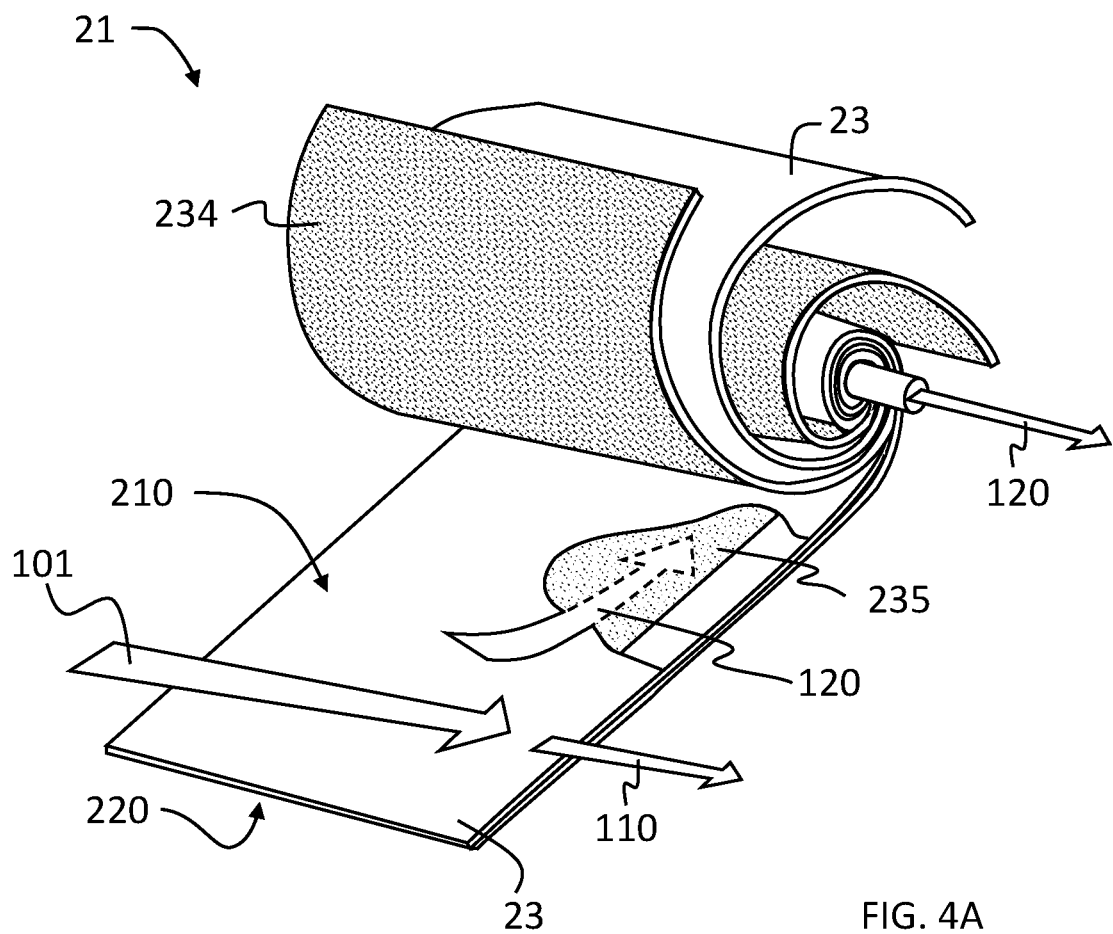
FIG. 4A is a schematic perspective view of the membrane filter used in the steam supply system of FIG. 1 according to an embodiment, where the membrane filter is shown partially unwound.
Figure 4B:
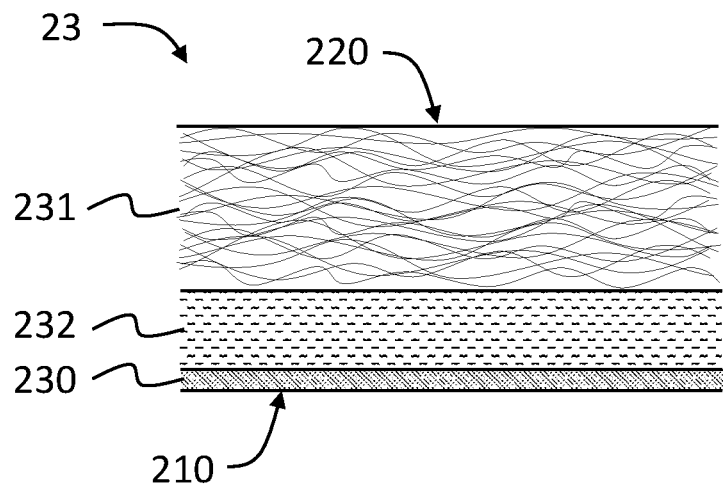
FIG. 4B is a schematic cross-sectional view of the separation membrane in the membrane filter of FIG. 4A.

In some embodiments, the membrane filters 21 are arranged as cross-flow filters. A schematic depiction of a membrane filter 21 that can be used in the membrane filtration system 20 is shown in FIG. 4A. The membrane filter 21 includes a separation membrane 23 selected to remove (e.g., retain) the organic compound(s) of interest. A schematic cross-sectional view of the separation membrane 23 is shown in FIG. 4B. The separation membrane 23 may include a separation layer 230 that is supported by one or more support layers 231, 232. In the exemplary embodiment shown, the separation layer 230 is supported by a first support layer 231 and a second support layer 232. The layers of the separation membrane 23 are arranged such that the first support layer 231 is on the permeate side 220 and the second support layer 232 is disposed between the first support layer 231 and the separation layer 230. When the steam reaches the separation layer 230, the membrane allows water vapor to pass through (e.g., permeate 120) to the permeate side 220, while rejecting the organic compound molecules and retaining them (e.g., retentate 110) on the retentate side 210 of the membrane filter 21.

The membrane filter 21 may include a plurality of layers of separation membranes 23. For example, the membrane filter 21 may be constructed as a wound roll of separation membranes 23, resulting in a cylindrical filter structure with input flow of steam 101 at one end and output flows of retentate 110 and permeate 120 at the other end. An example of a wound membrane filter 21 is shown as partially unwound in FIG. 4A. The layers of separation membranes 23 may be separated by spacers 234. The separation membrane 23 itself may also include a spacer layer 235 to facilitate flow of permeate 120.

The membrane filter 21 and the membrane filter system 20 may be made up of various components, such as the separation membrane 23, separation layer 230, the one or more support layers 231, 232, spacers, adhesives, seals, sealants, housing, lines, connectors, etc. The materials of the components of the membrane filter 21 and the membrane filter system 20 may be selected so that (1) the membrane filter system 20 effectively removes the organic compounds of interest from the steam, and (2) the materials can withstand the high temperature and pressure environment of the steam supply system 1. Steam supplied by the steam generator 10 is typically at a temperature of 100° C. or greater, e.g., about 95° C. or greater, about 100° C. or greater, or about 105° C. or greater, and/or up to about 135° C., up to about 140° C., up to about 150° C., or up to about 175° C. The system 1, including from the boiler to at least the retentate side 210 of the membrane filter 21, may be under pressure. For example, the system 1 may have an internal pressure of greater than atmospheric pressure, or of about 15 psi or greater, about 20 psi or greater, about 25 psi or greater, about 30 psi or greater, or about 35 psi or greater, and/or up to about 150 psi, up to about 100 psi, up to about 80 psi, up to about 50 psi, or up to about 35 psi.

According to an embodiment, the materials of the membrane filter 21 and the membrane filter system 20 do not substantially degrade in the presence of steam at a temperature of about 95° C. or greater, about 100° C. or greater, or about 105° C. or greater, and/or up to about 135° C., up to about 140° C., up to about 150° C., or up to about 175° C.; and/or at a pressure greater than atmospheric pressure, or about 5 psi or greater, about 10 psi or greater, about 15 psi or greater, about 20 psi or greater, or about 30 psi or greater, and/or up to about 150 psi, up to about 100 psi, up to about 80 psi, up to about 50 psi, or up to about 35 psi. The materials may include the separation layer 230 and any support layers 231, 232, spacers 234, 235, adhesives, seals, sealants, housing, lines, connectors, etc., used in the membrane filtration system 20.

The term "degrade" is used here generally to mean a change in the chemical structure or physical integrity (e.g., an elastic or plastic deformation) of the material. The materials may be chosen to exhibit less than a threshold change (e.g., reduction) in a rheological indicator of material integrity (e.g., "material suitability criteria"). For example, the rheological indicator may be selected as tensile modulus, stress at 10% tensile strain, stress at tensile break, and/or elongation at tensile break. The threshold may be selected to be about 3%, about 4%, about 5%, about 6%, about 8%, about 10%, about 12%, or about 15%. If, for example, a 5% threshold is selected, the material suitability criteria may be: less than 5% decrease in tensile modulus, less than 5% decrease in stress at 10% tensile strain, less than 5% decrease in stress at tensile break, and/or less than 5% deviation in elongation at tensile break. Degradation of the materials may be tested by exposing the material (e.g., a component prepared from the material) to a steam environment that simulates the steam supply system 1 for a selected period of time and evaluating the material for changes in rheological properties.

Preferred materials used in the membrane filter system include materials that are non-hydrolyzable in the steam environment. In some embodiments, the materials may be substantially free or free of polyesters, polyamides, cellulose acetates, or combinations thereof.

Another consideration when selecting materials for the system 1 is temperature fluctuations and different expansion rates of different materials during such temperature fluctuations. For example, the temperature (and pressure) of the system may fluctuate during start-up and shut-down of the boiler between atmospheric conditions and the steam environment conditions discussed above. Different expansion rates of materials could lead to failure of materials, connections, or adhesives, or delamination of membrane filter layers. According to some embodiments, the materials are selected so that they exhibit equal or similar expansion during temperature fluctuations.

According to some embodiments, the separation layer 230 includes a fluorinated (e.g., perfluorinated) polymer membrane. Suitable polymers for preparing the separation layer 230 are disclosed, for example, in U.S. Pat. No. 8,828,121 (He et al.), and include copolymers of one or more perfluorodioxolane monomers. Other polymers that are selective for an organic molecule of interest may also be used.

Preferably, the separation layer 230 has a high selectivity for $H_2/N_2$. For example, the separation layer 230 has a $H_2/N_2$ selectivity of 5 or greater, 6 or greater, 7 or greater, 8 or greater, 9 or greater, 10 or greater, or 12 or greater. While there is no desired upper limit for the $H_2/N_2$ selectivity of the separation membrane, in reality selectivities may range up to about 100. Certain monomeric components, such as tetrafluoroethylene (TFE), may result in lower selectivity of the polymeric film. In some embodiments, the separation membrane does not include tetrafluoroethylene (TFE) in the polymeric structure. However, TFE may be included in a support layer, spacer, or other layers that are not part of the separation layer.

In some embodiments the separation layer 230 includes a non-ionic fluorinated (e.g., perfluorinated) polymer membrane. In some embodiments the separation layer 230 is not an ion exchange membrane. The term "ion exchange membrane" is used here to refer to a membrane that includes chemical groups capable of combining with ions or exchanging ions between the membrane and an external substance. Such chemical groups may include sulfonic acid, carboxylic acid, phosphoric acid, phosphoric acid, arsenic groups, selenic groups, phenols, and salts thereof. Ion exchange membranes may require pretreating the membrane prior to use and periodically regenerating the membrane with an ionic fluid (e.g., and acid or base).

The separation layer 230 is supported by one or more support layers (e.g., a first and second support layer 231, 232). Support layer materials typically used in the prior art include cellulosic materials, which may not be able to withstand the steam environment. According to some embodiments, the one or more support layers include polysulfone, polyphenylene sulfide (PPS), polyvinylidenedifluoride (PVDF), polytetrafluoroethylene (PTFE), polyphenylsulfone (PPSU, available under tradename RADEL® R from Ensinger, Inc. in Washington, Pa.), polyetherimide (PEI, available under tradename ULTEM® from Sabic in Riyadh, Saudi Arabia), polyetheretherketone (PEEK), polyethersulfone (PES), poly ethylene chlorotrifluoroethylene (ECTFE, available under tradename HALAR® from Solvay USA Inc in Princeton, N.J.), poly ethylene tetrafluoroethylene (ETFE, available under tradename TEFZEL® from DuPont in Johnston, Iowa), polyfluorinated ethylene propylene (FEP), polychlorotrifluoroethylene (PCTFE, available under tradename NEOFLON™ from Daikin Industries, Ltd. in Osaka, Japan), perfluoroalkoxy (PFA, available under tradename NEOFLON™ from Daikin Industries, Ltd.), or a combination thereof. In one exemplary embodiment, at least one support layer is made from expanded PTFE.

The membrane filter 20 may include a plurality of layers of separation membranes 230 separated by spacers 234, and wherein the spacers 234 are constructed from polyamide, polyimide, polypropylene, polyethylene, PTFE, PVDF, polyester, or a combination thereof.

The membrane filter 20 may also include various adhesives. Preferably, the adhesives are selected to withstand the steam environment. Examples of suitable adhesives include thermoset adhesives (e.g., epoxides, aldehyde-containing resins, and urethane-based adhesives), thermoplastic adhesives (e.g., acrylates).

Over time, the membrane filter system 20 may experience fouling that can cause blockage of filters, membranes, and other filter parts and/or reduce filter efficiency. Examples of possible foulants include accumulated particulate impurities and precipitated salts (e.g., salts of amines and carbonic acid). To address fouling issues, the system may include one or more mechanisms for removing accumulated materials. For example, the system may include parallel filters that can be used while the other filter(s) is being regenerated; a wash for washing a filter; a backwash or backflush for washing a filter by running reverse flow through the filter; a heater for heating a filter to remove accumulated volatile components; or a combination thereof.

The system may also include a temperature control unit for controlling the temperature (e.g., maintaining a substantially constant temperature) downstream of the source of steam (e.g., boiler). The temperature control unit may include a temperature sensor (e.g., thermocouple), a control unit (e.g., microprocessor or any other suitable control unit), and a heating and/or cooling unit.

The membrane filter system 20 may include a mechanism for removing liquid water from the lines, and in particular from the line upstream of and leading into the membrane filter. Steam reaching the membrane filter 20 should be dry (i.e., not include liquid water) and substantially free of particulates. Liquid water in a high pressure, high velocity steam system can cause damage to components, particularly membranes. In many embodiments, a particle filter upstream of the membrane filter 20 may serve as the mechanism for removing liquid water or water droplets. However, if the system does not include a particle filter upstream of the membrane filter, or if the upstream particle filter is not near the membrane filter, the system may include another mechanism, such as baffles, a condensate trap, and/or a drain for removing liquid water.

In some cases, it may be desirable to reuse the organic component removed from the steam. For example, the organic component may be an anti-corrosion agent added to the steam in the boiler to prevent corrosion in the system. The anti-corrosion agent is removed before the steam is used at the point of use. However, it may be desirable to recycle the anti-corrosion agent back to the boiler for reuse. Thus, in some embodiments the system 1 includes a return line 60 from the retentate side 210 of the membrane filter 21 to the boiler 10 or to a boiler feed line (e.g., inlet line 30 or injection line 32). The system may include a return line 60 from the retentate side 210 to both the boiler 10 and to a boiler feed line (e.g., inlet line 30 or injection line 32).

The system 1 may also include additional components that are commonly used in steam supply systems, such as a steam header, valves, condensate traps, gauges, meters, various connecting lines, and the like.

Method

The treated (e.g., filtered) steam from the steam supply system 1 may be used at any point of use. However, points of use that mandate certain maximum levels of organic molecules or organic contaminants may particularly benefit from the steam supply system 1 of the present disclosure. For example, the steam supply system 1 may be used to provide clean steam to points of use such as humidification, sterilization, or culinary uses.

According to an embodiment, steam may be generated in the steam supply system 1 by heating water in a steam generator 10 (e.g., a boiler). Additives, such as anti-corrosive agents, may be added to the steam through an injection line 32, either directly into the steam generator 10, or into an input or output line. In one embodiment, anti-corrosion agent (e.g., amine) is dispensed to the boiler at a concentration of 5 ppm to 100 ppm. The anticorrosion agent may include one or more amines. In addition or alternatively, the steam may include other organic compounds that may be undesired at the point of use.

Anti-corrosive agents are commonly added to steam to protect the boiler and other connected components from the corrosive effects of steam. As steam is used and then condensed, carbon dioxide dissolves in the water, resulting in the formation of carbonic acid ($H_2CO_3$) and the lowering of the pH. The acidic water may then cause corrosion of piping and equipment. Anti-corrosion agents, such as neutralizing amines, may be used to alleviate the effects of low pH. Neutralizing amines hydrolyze in water, generating hydroxide ions that neutralize the acid.

Examples of amines that may be used as anti-corrosion agents include cyclohexylamine, morpholine, diethylaminoethanol (DEAE), and diethylhydroxylamine (DEHA), methoxypropylamine, ammonia, 2-amino-2-methyl-1-propanol (available from Angus chemical company as AMP-95), and 5,5-dimethyl-1-pyrroline-n-oxide (DMPO). Other suitable amines may also be used.

However, while amines or other anti-corrosive agents may be helpful in the steam supply system, some end uses call for steam that is substantially free or free of such components. For example, culinary steam may be used in food production, where the steam may come into contact with food ingredients or with surfaces used in the preparation of food. Additives permitted in culinary steam may be regulated by law, such as by C.F.R. Title 21, § 173.310 in the United States. Other uses where additives may not be desired include the use of steam in humidification and sterilization.

Steam may also include other organic compounds or organic contaminants that may be additives (i.e., intentionally added to the steam) or that are present in the feed water into the steam supply system 1. The steam supply system 1 may also be used to remove such other organic compounds and organic contaminants. In particular, the steam supply system 1 may be used to remove volatile organic compounds and contaminants.

According to an embodiment, steam from the steam generator 10 is lead to the membrane filter system 20 through a steam output line 40. The steam leaving the steam generator 10 is typically under high pressure and/or temperature, and may have a high flow rate. For example, the steam may have a temperature of about 95° C. or greater, about 100° C. or greater, or about 105° C. or greater, and/or up to about 135° C., up to about 140° C., up to about 150° C., or up to about 180° C. The steam may be at a pressure of greater than atmospheric pressure, or of about 15 psi or greater, about 20 psi or greater, about 25 psi or greater, about 30 psi or greater, or about 35 psi or greater, and/or up to about 150 psi, 100 psi, up to about 80 psi, up to about 50 psi, or up to about 35 psi.

The steam may first be lead through one or more particle filters, such as the particle filters 241, 243, and 245 shown in FIG. 3. If a plurality of particle filters is used, the filters may be arranged from coarse to fine. Particles and condensate captured by the particle filters may be trapped in corresponding traps 242, 244, 246. After removing particulate matter from the steam, the steam is led into the membrane filter 21. According to an embodiment, the membrane filter 21 is arranged as a cross-flow filter, and a cross-flow of steam 101 enters the membrane filter 21 on the retentate side 210, where the target organic compounds (e.g., anti-corrosion agents, such as amines, or organic contaminants) are retained and removed as retentate 110. Water vapor permeates the separation membrane 23 and enters the permeate side 220 as permeate 120. The permeate 120 is substantially clean and dry steam that may be removed from the system and delivered to the point of use via output line 50. Optionally, the steam may be directed through an additional filter 22, such as an adsorbent filter and/or an additional particulate filter. An adsorbent filter may be used as a polishing step to remove trace amounts of organic compounds (e.g., anti-corrosion agents, such as amines, or organic contaminants) from the permeate.

The membrane filter 21, which may include multiple membrane filter units each housing a separation membrane 23 as described above, may be constructed to reject (e.g., retain) at least 50 wt-%, at least 75 wt-%, at least 80 wt-%, at least 85 wt-%, at least 90 wt-%, at least 95 wt-%, at least 98 wt-%, at least 99 wt-%, or 100 wt-% of the organic compounds of interest. The membrane filter 21 may be constructed to reject (e.g., retain) at least 50 wt-%, at least 75 wt-%, at least 80 wt-%, at least 85 wt-%, at least 90 wt-%, at least 95 wt-%, at least 98 wt-%, at least 99 wt-%, or 100 wt-% of the organic compounds introduced to the membrane filter at a concentration of 1,000 ppm or less, 900 ppm or less, 800 ppm or less, 700 ppm or less, 600 ppm or less, 500 ppm or less, 400 ppm or less, 300 ppm or less, 200 ppm or less, 100 ppm or less, 50 ppm or less, 40 ppm or less, 30 ppm or less, 20 ppm or less, or 10 ppm or less.

The cross-flow of steam 101 may have a first concentration of the organic compound, and the permeate 120 may have a second concentration of the organic compound. The first concentration of organic compound may be 1,000 ppm or less, 900 ppm or less, 800 ppm or less, 700 ppm or less, 600 ppm or less, 500 ppm or less, 400 ppm or less, 300 ppm or less, 200 ppm or less, 100 ppm or less, 50 ppm or less, 40 ppm or less, 30 ppm or less, 20 ppm or less, or 10 ppm or less. The second concentration may be about 1% or less, about 2% or less, about 5% or less, about 10% or less, about 15% or less, or about 20% or less of the first concentration. The adsorbent filter may be constructed to remove at least 50 wt-%, at least 75 wt-%, at least 80 wt-%, at least 85 wt-%, at least 90 wt-%, at least 95 wt-%, at least 98 wt-%, at least 99 wt-%, or 100 wt-% of the organic compounds of interest remaining in the steam permeate after the membrane filter 21. The filtered steam leaving the adsorbent filter may have a third concentration of organic compound, which may be about 1% or less, about 2% or less, about 5% or less, about 10% or less, about 15% or less, or about 20% or less of the second concentration (permeate 120).

For example, it may be desirable that the steam, while in the boiler 10 and the lines leading up to the membrane filter 21, includes a concentration (e.g., a first concentration) of about 20 ppm to about 200 ppm of anti-corrosion agent (e.g., amine). It may further be desirable that the treated steam leaving the membrane filtration system 20 (via line 50) has a concentration (e.g., a second concentration) of less than about 10 ppm of anti-corrosion agent (e.g., amine). If the membrane filtration system 20 includes an adsorbent filter, the treated steam leaving the membrane filtration system 20 may have a concentration (e.g., a third concentration) of about 5 ppm or less of anti-corrosion agent (e.g., amine). In some preferred embodiments, the level of the anti-corrosion agent (e.g., amine) in the treated steam is at a non-detectable level (e.g., less than 1 ppm), or the treated steam is substantially free of the anti-corrosion agent (e.g., amine).

The rejected (e.g., retained) organic compound may be re-used in the system. For example, retentate 110, which may include recovered anti-corrosion agent (e.g., an amine), may be returned to the steam generator 10 (e.g., boiler) via a return line 60. The organic compound (e.g., anti-corrosion agent) is concentrated in the retentate 110, which may have a fourth concentration of the organic compound. The fourth concentration may be about 10 wt-% or greater, about 20 wt-% or greater, about 50 wt-% or greater, about 80 wt-% or greater, or about 90 wt-% or greater.

In one exemplary embodiment, anti-corrosion agent (e.g., amine) is added to a boiler used to produce steam. The anti-corrosion agent (e.g., amine) may be added at a concentration of 200 ppm or less, 100 ppm or less, 50 ppm or less, 40 ppm or less, 30 ppm or less, 20 ppm or less, or 10 ppm or less. Typically, anti-corrosion agent (e.g., amine) may be added at a concentration of about 10 ppm to about 50 ppm. The steam from the boiler is then lead to the membrane filter system through a steam output line to remove or substantially remove the anti-corrosion agent (e.g., amine). The treated steam preferably contains anti-corrosion agent (e.g., amine) at a concentration of 10 ppm or less, 5 ppm or less, 4 ppm or less, 3 ppm or less, 2 ppm or less, 1 ppm or less, 0.5 ppm or less, 0.2 ppm or less, or 0.1 ppm or less. The anti-corrosion agent (e.g., amine) removed from the steam as retentate may be reused, for example, returned to the boiler via a return line.

The method may further include washing, backflushing, and/or cleaning steps to remove accumulated particulates, precipitates, scale, or other forms of fouling from the system. Washing and backflushing steps may include washing or flushing with water and optionally with high or low pH cleaning agents. Cleaning steps may further include heating and rinsing cycles. In some embodiments, the system includes parallel filters (e.g., parallel particle filters, parallel membrane filters, and/or parallel adsorbent filters), and during a cleaning cycle, one of the parallel filters is cleaned while the other remains active.

with 0.001 N Hydrochloric Acid or 0.01 N Hydrochloric Acid, using an Ag/AgCl electrode (Thermo Scientific) and a VWR Symphony SB70-P pH meter.

Morphine, cyclohexylamine, and diethylaminoethanol were obtained from Sigma-Aldrich. Aqueous solutions of the amines were prepared using deionized water.

The membranes were characterized by their nitrogen gas permeance as:
- Membrane A: 185 gpu (gas permeation unit) nitrogen permeance, $H_2/N_2$ selectivity=6.6
- Membrane B: 130 gpu nitrogen permeance, $H_2/N_2$ selectivity=7.8
- Membrane C: 50 gpu nitrogen permeance, $H_2/N_2$ selectivity=12

About 800 cc of amine solution was brought to boiling at atmospheric pressure in a vessel with a membrane sample holder at the top. The tested membrane was in contact with the vapor phase produced by the boiling process and the vapor was continuously recirculated over the membrane surface using a condensation/reflux mechanism. Permeation of water and amines was achieved by maintaining a vacuum in the range of 4 to 10 torr on the permeate side. The permeate was collected in a liquid nitrogen trap. The performance of each membrane was tested separately with the three different amines.

The starting and ending concentrations of the amines in the solution and the amine concentration in the permeate at the end of the experiment were recorded. The average amine concentration in the solution during the test was calculated. The results are shown in TABLE 1 below.

TABLE 1

Test results.

| | Concentration | | | | Rejection Ratio: Feed/Permeate | Permeance Water (GPU) |
|---|---|---|---|---|---|---|
| | Solution Start (ppm) | Solution End (ppm) | Solution Average (ppm) | Permeate (ppm) | | |
| Membrane A | | | | | | |
| Cyclohexylamine | 1010 | 227 | 620 | 136 | 4.6 | 2800 |
| Morpholine | 1020 | 1110 | 1060 | 99 | 11 | 2610 |
| Diethylethanolamine | 1020 | 874 | 948 | 236 | 4.0 | 2500 |
| Membrane B | | | | | | |
| Cyclohexylamine | 1030 | 749 | 890 | 17 | 52 | 2030 |
| Morpholine | 1020 | 1150 | 1080 | 22 | 49 | 2350 |
| Diethylethanolamine | 875 | 725 | 800 | 30 | 27 | 2120 |
| Membrane C | | | | | | |
| Cyclohexylamine | 1020 | 413 | 714 | 7 | 102 | 1150 |
| Morpholine | 993 | 1030 | 1010 | 11 | 92 | 949 |
| Diethylethanolamine | 1050 | 445 | 747 | 14 | 53 | 1150 |

EXAMPLES

The ability of three different membranes (A, B, and C) with different $H_2/N_2$ selectivities to separate amines from steam was tested.

The membranes were tested in a laboratory scale system with a steam feed vapor mixture at 100° C. and atmospheric pressure. Steam was obtained by boiling deionized water containing either cyclohexylamine, morpholine or diethylaminoethanol at 100 or 1,000 ppmw (parts per million by weight). A vacuum of 4 to 10 torr was maintained on the permeate side. The permeate was collected in a liquid nitrogen trap and analyzed for amine content by titration It was observed that the water vapor permeance was the highest for membrane A and the lowest for membrane C. It was further observed that all three membranes rejected the tested amines, and the highest rejection ratio was obtained with membrane C, which had a $H_2/N_2$ selectivity of 12, highest of the three tested membranes. For membrane C, the rejection ratios were 102 for cyclohexylamine, 92 for morpholine, and 53 for diethylethanolamine. It was also observed that all membranes had the highest rejection ration for cyclohexylamine, and the lowest for diethylethanolamine.

ASPECTS

The following is a list of exemplary aspects of the articles according to the present disclosure.

According to aspect 1, a system for producing steam comprises: a boiler comprising a steam output; a membrane filtration system in fluid communication with the steam output, the membrane filtration system comprising: a first membrane filter with a permeate side and an opposing retentate side, the membrane filter comprising: a separation membrane adjacent the permeate side, the separation membrane being constructed to reject organic molecules; and one or more support layers adjacent the retentate side.

Aspect 2 is the system of aspect 1 further comprising an organic molecule injection line operatively connected to the boiler.

Aspect 3 is the system of aspect 1 or 2, wherein the separation membrane comprises a perfluorinated polymer membrane.

Aspect 4 is the system of any one of aspects 1-3, wherein the separation membrane comprises a one or more support layers comprising polyamide, polyimide, polysulfone, polyphenylene sulfide, PVDF, PTFE, or a combination thereof.

Aspect 5 is the system of any one of aspects 1-4, wherein the membrane filter comprises adhesives that do not substantially degrade in the presence of steam at a temperature of about 95° C. or greater, about 100° C. or greater, or about 105° C. or greater, and/or up to about 135° C., up to about 140° C., up to about 150° C., or up to about 180° C.; and/or at a pressure greater than atmospheric pressure, or about 5 psi or greater, about 10 psi or greater, about 15 psi or greater, about 20 psi or greater, or about 30 psi or greater, and/or up to about 150 psi, up to about 100 psi, up to about 80 psi, up to about 50 psi, or up to about 35 psi.

Aspect 6 is the system of any one of aspects 1-5, wherein the membrane filter comprises a plurality of layers of separation membranes separated by spacers, and wherein the spacers are constructed from polyamide, polyimide, polypropylene, polyethylene, PTFE, PVDF, or a combination thereof.

Aspect 7 is the system of any one of aspects 1-6, wherein the organic molecules comprise volatile organic contaminants.

Aspect 8 is the system of any one of aspects 1-7, wherein the organic molecules comprise an anti-corrosion agent.

Aspect 9 is the system of any one of aspects 1-8, wherein the organic molecules comprise an amine, and wherein optionally the amine may be selected from cyclohexylamine, morpholine, diethylethanolamine, diethylaminoethanol (DEAE), and diethylhydroxylamine (DEHA).

Aspect 10 is the system of any one of aspects 1-9, wherein the separation membrane is constructed to reject at least 90 wt-% of the organic molecules.

Aspect 11 is the system of any one of aspects 1-10 further comprising a return line from the retentate side to the boiler or boiler feed line.

Aspect 12 is the system of any one of aspects 1-11 further comprising a return line from the retentate side to the boiler and to the boiler feed line.

Aspect 13 is the system of any one of aspects 1-12 further comprising one or more additional filters upstream of the membrane filter or downstream of the membrane filter permeate side.

Aspect 14 is the system of aspect 13, wherein the one or more additional filters comprise a second membrane filter, an adsorbent filter, a particle filter, or a combination thereof.

Aspect 15 is the system of aspect 13 or 14, wherein the one or more additional filters comprise one or more particle filters upstream of the first membrane filter.

Aspect 16 is the system of any one of aspects 13-15, wherein the one or more additional filters comprise one or more particle filters downstream of the permeate side of the first membrane filter.

Aspect 17 is the system of any one of aspects 13-16, wherein the one or more additional filters comprise a second membrane filter arranged in parallel with the first membrane filter.

Aspect 18 is the system of any one of aspects 13-17, wherein the one or more additional filters comprise a second membrane filter arranged in series with the first membrane filter.

Aspect 19 is the system of any one of aspects 13-18, wherein the one or more additional filters comprise a first adsorbent filter and a second adsorbent filter arranged in parallel with one another.

Aspect 20 is the system of any one of aspects 13-19, wherein the one or more additional filters comprise a first adsorbent filter and a second adsorbent filter arranged in series with one another.

Aspect 21 is the system of any one of aspects 1-20 further comprising a second filtration system comprising a second membrane filter, an adsorbent filter, or both.

Aspect 22 is the system of any one of aspects 1-21, wherein the separation membrane does not substantially degrade at a temperature of about 95° C. or greater, about 100° C. or greater, or about 105° C. or greater, and/or up to about 135° C., up to about 140° C., up to about 150° C., or up to about 180° C.

Aspect 23 is the system of any one of aspects 1-22, wherein the separation membrane does not substantially degrade at a pressure greater than atmospheric pressure, or about 5 psi or greater, about 10 psi or greater, about 15 psi or greater, about 20 psi or greater, or about 30 psi or greater, and/or up to about 150 psi, up to about 100 psi, up to about 80 psi, up to about 50 psi, or up to about 35 psi.

Aspect 24 is the system of any one of aspects 1-23, wherein the steam output has a capacity of at least about 10 lbs/hour (about 5 kg/h), at least about 100 lbs/hour (about 50 kg/h), at least about 500 lbs/hour (about 200 kg/h), and/or up to about 1,000 lbs/hour (about 500 kg/h), up to about 5,000 lbs/hour (about 2,000 kg/h), or up to about 10,000 lbs/hour (about 5,000 kg/h).

Aspect 25 is the system of any one of aspects 1-24, wherein the system is in fluid communication with a point of use comprising a sterilizer, a humidifier, or a culinary steam outlet.

Aspect 26 is the system of any one of aspects 1-25, wherein the system and the point of use are separated by a distance no greater than 10 meters, no greater than 3 meters, or no greater than 1 meter.

According to aspect 27, a method for removing an organic compound from steam comprises: directing a cross-flow of pressurized steam comprising a first concentration of the organic compound across a membrane filter, the membrane filter comprising: a separation membrane constructed to reject the organic compound; and one or more support layers adjacent the separation membrane; and collecting a steam permeate comprising a second concentration of the organic compound lower than the first concentration.

Aspect 28 is the method of aspect 27, wherein the pressurized steam has a temperature of about 95° C. or greater, about 100° C. or greater, or about 105° C. or greater, and/or up to about 135° C., up to about 140° C., up to about 150° C., or up to about 180° C.

Aspect 29 is the method of aspect 27 or 28, wherein the pressurized steam has a pressure greater than atmospheric pressure, or about 5 psi or greater, about 10 psi or greater, about 15 psi or greater, about 20 psi or greater, or about 30 psi or greater, and/or up to about 150 psi, up to about 100 psi, up to about 80 psi, up to about 50 psi, or up to about 35 psi.

Aspect 30 is the method of any one of aspects 27-29, wherein the organic compound comprises an anti-corrosion agent.

Aspect 31 is the method of any one of aspects 27-30, wherein the organic compound comprises an amine.

Aspect 32 is the method of any one of aspects 27-31, wherein the first concentration is greater than 20 ppm and the second concentration is lower than 10 ppm.

Aspect 33 is the method of any one of aspects 27-32, wherein the second concentration is 1% or less, about 2% or less, about 5% or less, about 10% or less, about 15% or less, or about 20% or less of the first concentration.

Aspect 34 is the method of any one of aspects 27-33 further comprising recovering a retentate comprising the organic compound.

Aspect 35 is the method of any one of aspects 27-34 further comprising reusing the organic compound.

Aspect 36 is the method of any one of aspects 27-35 further comprising generating the steam in a steam boiler and returning the retentate to the steam boiler or boiler feed line.

Aspect 37 is the method of any one of aspects 27-36 further comprising generating the steam in a steam boiler and returning the retentate to the steam boiler and boiler feed line.

Aspect 38 is the method of any one of aspects 36-37 further comprising dispensing anti-corrosion agent to the boiler at a concentration of 5 ppm to 100 ppm.

Aspect 39 is the method of aspect 38, wherein the anti-corrosion agent comprises one or more amines.

Aspect 40 is the method of aspect 39, wherein the amines are selected from cyclohexylamine, morpholine, diethylethanolamine, diethylaminoethanol (DEAE), and diethylhydroxylamine (DEHA).

Aspect 41 is the method of any one of aspects 27-40 further comprising passing the steam permeate through a second membrane filter or an adsorbent filter.

Aspect 42 is the method of aspect 41, wherein a treated steam output after the second membrane filter or the adsorbent filter has a third concentration of the organic compound, and wherein the third concentration is less than 5 ppm, or wherein the third concentration is about 1% or less, about 2% or less, about 5% or less, about 10% or less, about 15% or less, or about 20% or less of the second concentration.

Aspect 43 is the method of any one of aspects 27-42, wherein the separation membrane comprises a perfluorinated polymer membrane.

Aspect 44 is the method of any one of aspects 27-43, wherein the separation membrane comprises a one or more support layers comprising polyamide, polyimide, polysulfone, polyphenylene sulfide, PVDF, PTFE, or a combination thereof.

Aspect 45 is the method of any one of aspects 27-44 further comprising washing, back flushing, or heating the membrane filter.

Aspect 46 is the method of any one of aspects 27-45 further comprising washing, back flushing, or heating the adsorbent filter.

Aspect 47 is the method of any one of aspects 27-46, wherein the steam permeate has a retention time of less than 10 seconds or less, about 5 seconds or less, about 2 seconds or less, about 1 seconds or less, about 0.5 seconds or less, or about 0.1 seconds or less between a treated steam outlet and a point of use.

Aspect 48 is the method of aspect 47, wherein the treated steam outlet is an outlet of the membrane filter.

Aspect 49 is the method of any one of aspects 27-48, wherein the cross-flow of the pressurized steam has a flow rate of about 10 lbs/hour (about 5 kg/h) to about 10,000 lbs/hour (about 5,000 kg/h).

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims set forth here.

The invention claimed is:

1. A system for producing steam, the system comprising:
a boiler comprising a steam output; and
a membrane filtration system in fluid communication with the steam output, the membrane filtration system comprising:
a first membrane filter with a permeate side and an opposing retentate side, the membrane filter comprising:
a separation membrane adjacent the permeate side, the separation membrane being constructed to reject organic molecules comprising an amine, wherein the separation membrane is not an ion exchange membrane; and
one or more support layers adjacent the retentate side.

2. The system of claim 1, wherein the separation membrane comprises a perfluorinated polymer membrane.

3. The system of claim 1, wherein the separation membrane comprises a one or more support layers comprising polyamide, polyimide, polysulfone, polyphenylene sulfide, PVDF, PTFE, or a combination thereof.

4. The system of claim 1, wherein the first membrane filter comprises a plurality of layers of separation membranes separated by spacers, and wherein the spacers are constructed from polyamide, polyimide, polypropylene, polyethylene, PTFE, PVDF, or a combination thereof.

5. The system of claim 1, wherein the separation membrane is constructed to reject at least 90 wt-% of the organic molecules.

6. The system of claim 1 further comprising a return line from the retentate side to the boiler or boiler feed line or both.

7. The system of claim 1 further comprising one or more additional filters upstream of the membrane filter or downstream of the membrane filter permeate side, the one or more additional filters comprising a second membrane filter, an adsorbent filter, a particle filter, or a combination thereof.

8. The system of claim 1 further comprising one or more additional filters arranged in parallel with the first membrane filter, the one or more additional filters comprising a second membrane filter, an adsorbent filter, a particle filter, or a combination thereof.

9. The system of claim 7, wherein the one or more additional filters comprise a first adsorbent filter and a second adsorbent filter arranged in parallel or in series with one another.

10. The system of claim 1, wherein the separation membrane does not substantially degrade at a temperature of about 100° C. to about 180° C. and/or at a pressure of above atmospheric pressure and up to about 100 psi.

11. The system of claim 1, wherein the system is in fluid communication with a point of use comprising a sterilizer, a humidifier, or a culinary steam outlet, and wherein the system and the point of use are separated by a distance no greater than 10 meters.

12. A method for removing an amine from steam, the method comprising:

directing a cross-flow of pressurized steam comprising a first concentration of the amine across a membrane filter, the pressurized steam having a temperature of about 100° C. to about 150° C. and a pressure of above atmospheric pressure and up to about 100 psi, the membrane filter comprising:

a separation membrane constructed to reject the amine, wherein the separation membrane is not an ion exchange membrane; and one or more support layers adjacent the separation membrane; and collecting a steam permeate comprising a second concentration of the amine lower than the first concentration.

13. The method of claim 12, wherein the first concentration is greater than 20 ppm and the second concentration is lower than 10 ppm.

14. The method of claim 12, wherein the second concentration is 10% or less of the first concentration.

15. The method of claim 12 further comprising recovering a retentate comprising the amine and reusing the amine.

16. The method of claim 12 further comprising generating the steam in a steam boiler and returning the retentate to the steam boiler or boiler feed line or both the steam boiler and the boiler feed line.

17. The method of claim 16 further comprising dispensing anti-corrosion agent comprising the amine to the boiler at a concentration of 5 ppm to 100 ppm.

18. The method of claim 17, wherein the anti-corrosion agent comprises one or more amines selected from cyclohexylamine, morpholine, diethylethanolamine, diethylaminoethanol (DEAE), and diethylhydroxylamine (DEHA).

* * * * *